(12) United States Patent
Son et al.

(10) Patent No.: US 8,779,037 B2
(45) Date of Patent: Jul. 15, 2014

(54) POLYCARBONATE RESIN COMPOSITION WITH EXCELLENT FLAME RETARDANCY

(75) Inventors: Seon Mo Son, Daejeon (KR); Kyung Mo Park, Daejeon (KR); Sung Tae Ahn, Daejeon (KR); Yong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/919,423

(22) PCT Filed: Dec. 28, 2008

(86) PCT No.: PCT/KR2008/007730
§ 371 (c)(1), (2), (4) Date: Jan. 19, 2011

(87) PCT Pub. No.: WO2009/104866
PCT Pub. Date: Aug. 27, 2009

(65) Prior Publication Data
US 2011/0124781 A1   May 26, 2011

(30) Foreign Application Priority Data
Dec. 28, 2007   (KR) .................. 10-2007-0140074

(51) Int. Cl.
| | | |
|---|---|---|
| *C08K 5/52* | (2006.01) | |
| *C08L 69/00* | (2006.01) | |
| *C08K 5/42* | (2006.01) | |
| *C08K 5/521* | (2006.01) | |
| *C08L 33/12* | (2006.01) | |
| *C08L 27/18* | (2006.01) | |
| *C08K 5/523* | (2006.01) | |
| *C08L 25/12* | (2006.01) | |

(52) U.S. Cl.
CPC . *C08L 69/00* (2013.01); *C08K 5/42* (2013.01); *C08K 5/521* (2013.01); *C08L 33/12* (2013.01); *C08L 27/18* (2013.01); *C08K 5/523* (2013.01); *C08L 25/12* (2013.01)
USPC .................. 524/115; 524/120; 524/127

(58) Field of Classification Search
CPC .......... C08K 5/42; C08K 5/521; C08L 33/12
USPC ............................................ 524/115
See application file for complete search history.

(56) References Cited

U.S. PATENT DOCUMENTS

| | | | | |
|---|---|---|---|---|
| 3,775,367 A | * | 11/1973 | Nouvertne | 524/165 |
| 4,178,281 A | | 12/1979 | Horn, Jr. | |
| 4,735,978 A | * | 4/1988 | Ishihara | 524/162 |
| 5,280,070 A | * | 1/1994 | Drzewinski | 525/148 |
| 6,632,891 B1 | | 10/2003 | Tada et al. | |
| 2004/0176505 A1 | | 9/2004 | Seidel et al. | |
| 2006/0030647 A1 | * | 2/2006 | Ebeling et al. | 524/115 |
| 2006/0280934 A1 | * | 12/2006 | Wenz et al. | 428/336 |
| 2009/0118402 A1 | | 5/2009 | Jang et al. | |

FOREIGN PATENT DOCUMENTS

| | | |
|---|---|---|
| CN | 1737058 A | 2/2006 |
| KR | 10-1993-0005826 B1 | 6/1993 |
| KR | 10-0767428 B1 | 10/2007 |
| WO | 90/03417 A1 | 4/1990 |
| WO | 2007/119920 A1 | 10/2007 |

OTHER PUBLICATIONS

A First Office Action issued in the Taiwanese Patent Application No. 097151248 with an English translation (10 pages).
Office Action issued in Chinese Patent Appl. No. 200880127152.0 on Feb. 29, 2012 along with English translation, 11 pages.

* cited by examiner

*Primary Examiner* — Doris Lee
(74) *Attorney, Agent, or Firm* — Rothwell, Figg, Ernst & Manbeck, P.C.

(57) ABSTRACT

A polycarbonate resin composition is provided. The composition comprises (A) 50 to 90% by weight of a polycarbonate resin, (B) 5 to 30% by weight of a polymethyl methacrylate resin, (C) 5 to 20% by weight of a phosphate compound, (D) 0.01 to 2% by weight of a metal sulfonate as an organic salt, and (E) 0.05 to 2% by weight of a fluorinated olefin. The composition is highly flame retardant and scratch resistant.

6 Claims, No Drawings

POLYCARBONATE RESIN COMPOSITION WITH EXCELLENT FLAME RETARDANCY

CROSS REFERENCE TO RELATED APPLICATIONS

This application is a 35 U.S.C. §371 National Phase Entry Application from PCT/KR2008/007730, filed Dec. 28, 2008, and designating the United States, which claims priority under 35 U.S.C. §119 to Korean Patent Application No. 10-2007-0140074 filed Dec. 28, 2007, which are incorporated herein in their entireties.

TECHNICAL FIELD

The present invention relates to a flame-retardant, scratch-resistant polycarbonate resin composition. More specifically, the present invention relates to a polycarbonate resin composition in which an aromatic polycarbonate resin is blended with a highly scratch-resistant polymethyl methacrylate resin to achieve excellent flame retardancy and good scratch resistance.

BACKGROUND ART

In general, polycarbonate resins are used in a variety of applications, including electrical/electronic devices and office machinery as well as automotive components, due to their high transparency, good resistance to impact and heat, and excellent electrical properties. Polycarbonate resins are also applied to large-sized injection-molded articles that release a large amount of heat. Taking into account the applications (including heat-releasing electronic products) of polycarbonate resins, the use of flame retardants is needed to impart polycarbonate resins with flame retardancy. Since a number of known brominated and chlorinated flame retardants evolve gases harmful to humans upon combustion, regulatory guidelines restricting their use become increasingly stringent in many countries. Furthermore, impurities and by-products from brominated and chlorinated flame retardants may undesirably corrode facilities and equipment associated with the production and use of polycarbonate resins. Under such circumstances, there is a need for non-halogenated flame retardants to improve the flame retardance properties of polycarbonate resins. For example, various kinds of phosphorus-containing compounds and specific salts may be included in non-halogenated flame retardants. Further, there is an increasing need for high-gloss, flame-retardant, scratch-resistant materials for use in housings of displays and electric home appliances. However, polycarbonate resins are not suitable for use as materials for housings of electrical and electronic products that require scratch resistance because of their low hardness.

DISCLOSURE OF INVENTION

Technical Problem

The present invention has been made in an effort to solve the above problems, and it is an object of the present invention to provide a polycarbonate resin composition that uses a blend of a polycarbonate resin and a polymethyl methacrylate resin to achieve excellent flame retardancy and good scratch resistance. The polycarbonate resin composition utilizes the advantages (e.g., good resistance to impact and heat and excellent flame retardancy) of the polycarbonate resin and the advantages (e.g., high hardness and good scratch resistance) of the polymethyl methacrylate resin to overcome poor scratch resistance, which limits its use as a housing material, of the polycarbonate resin.

Technical Solution

According to an aspect of the present invention, there is provided a flame-retardant, scratch-resistant polycarbonate resin composition that comprises (A) 50 to 90% by weight of a polycarbonate resin, (B) 5 to 30% by weight of a polymethyl methacrylate resin, (C) 5 to 20% by weight of a phosphate compound, (D) 0.01 to 2% by weight of a metal sulfonate as an organic salt, and (E) 0.05 to 2% by weight of a fluorinated olefin.

In a preferred embodiment, the polycarbonate resin is prepared by reacting a divalent phenolic compound with phosgene or a carbonic acid diester compound and contains no halogen.

In a preferred embodiment, the polymethyl methacrylate resin is selected from methyl methacrylate homopolymers, methyl methacrylate-acrylate copolymers, and mixtures thereof.

In a preferred embodiment, the phosphate compound is selected from a monophosphate, an aromatic diphosphate and a mixture thereof.

In a preferred embodiment, the monophosphate is selected from the group consisting of a halogen-free trialkyl phosphate, a halogen-free triaryl phosphate and a halogen-free trialkyl-aryl phosphate.

In a preferred embodiment, the trialkyl phosphate is selected from the group consisting of trimethyl phosphate, triethyl phosphate, tributyl phosphate and trioctyl phosphate; the triaryl phosphate is selected from the group consisting of triphenyl phosphate, tricresyl phosphate, trixylenyl phosphate and cresyl diphenyl phosphate; and the trialkyl-aryl phosphate is octyl diphenyl phosphate.

In a preferred embodiment, the aromatic diphosphate is a compound represented by Formula 1:

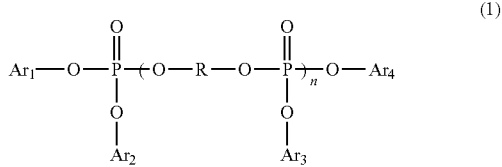

(1)

wherein $Ar_1$, $Ar_2$, $Ar_3$ and $Ar_4$ are independently a phenyl group or a $C_1$-$C_3$ aryl group substituted with one to three $C_1$-$C_4$ alkyl groups, R is phenyl or bisphenol A, and n is an integer of 4 or 5, the compound represented by Formula 2:

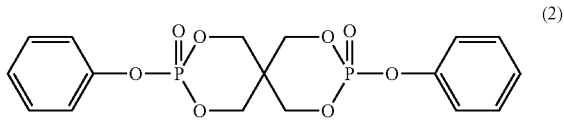

(2)

or a mixture thereof.

In a preferred embodiment, the organic salt is selected from commercially available metal sulfonates, and specific examples thereof include potassium diphenylsulfone sulfonate (KSS), potassium perfluorobutyl sulfonate (KPFBS), sodium trichlorobenzene sulfonate and sodium polystyrene sulfonate. The use of the organic salt improves the flame retardancy of the polycarbonate resin composition.

In a preferred embodiment, the fluorinated olefin is Teflon, a mixture of Teflon and poly(styrene-acrylonitrile), or a mixture of Teflon and polymethyl methacrylate.

In a preferred embodiment, the composition of the present invention further comprises one or more additives selected from the group consisting of impact modifiers, lubricants, heat stabilizers, UV stabilizers, anti-drip agents, pigments, dyes, and inorganic fillers.

Advantageous Effects

The polycarbonate resin composition of the present invention is suitable for use as a material for exterior housing components of displays and electrical/electronic products due to its excellent flame retardancy and good resistance to impact and scratches.

BEST MODE FOR CARRYING OUT THE INVENTION

The present invention provides a flame-retardant, scratch-resistant polycarbonate resin composition comprising (A) a polycarbonate resin, (B) a polymethyl methacrylate, (C) a phosphate compound, (D) a metal sulfonate as an organic salt, and (E) a fluorinated olefin.

The individual components of the polycarbonate resin composition according to the present invention will now be described in detail.

The polycarbonate resin may be prepared by reacting a divalent phenol with phosgene or a carbonate compound as a polycarbonate precursor. Specifically, the polycarbonate resin is prepared by reacting a divalent phenol with phosgene as a polycarbonate precursor or transesterifying a divalent phenol with diphenyl carbonate as a polycarbonate precursor in the presence of a known acid receptor or molecular weight modifier in a suitable solvent (e.g., methylene chloride). Optionally, a chain-branching agent may be added during the reaction. The polycarbonate resin is preferably used in an amount of 50 to 90% by weight. If the polycarbonate resin is used in an amount of less than 50% by weight, sufficient flame retardancy is not imparted to the composition. If the polycarbonate resin is used in an amount of more than 90% by weight, sufficient scratch resistance is not imparted to the composition due to the relatively small amount of the polymethyl methacrylate.

Polymethyl methacrylate (PMMA) refers to a polymer of methyl methacrylate (MMA), and includes methyl methacrylate homopolymers and methyl methacrylate-acrylate copolymers.

Polymethyl methacrylate has poor impact resistance but exhibits excellent characteristics in terms of transparency, weather resistance, mechanical strength (e.g., tensile strength and modulus of elasticity), surface gloss, chemical resistance and adhesiveness. Particularly, polymethyl methacrylate has good scratch resistance due to its high hardness. Based on these advantages, polymethyl methacrylate is widely used in various applications, such as decorative articles, signboards, lighting materials and construction materials.

The polymethyl methacrylate is preferably used in an amount of 5 to 30% by weight. If the polymethyl methacrylate is used in an amount of less than 5% by weight, sufficient scratch resistance is not imparted to the composition. If the polymethyl methacrylate is used in an amount of more than 30% by weight, sufficient flame retardancy is not imparted to the composition and satisfactory impact strength of the composition is no longer obtained.

The phosphate compound is used as a flame retardant. As the phosphate compound, a monophosphate and an aromatic diphosphate may be used alone or as a mixture thereof. The monophosphate may be selected from the group consisting of: halogen-free trialkyl phosphates, such as trimethyl phosphate, triethyl phosphate, tributyl phosphate and trioctyl phosphate; halogen-free triaryl phosphates, such as triphenyl phosphate, tricresyl phosphate, trixylenyl phosphate and cresyl diphenyl phosphate; and halogen-free trialkyl-aryl phosphates, such as octyl diphenyl phosphate. The monophosphate is preferably a triaryl phosphate, and more preferably triphenyl phosphate, tri(4-methylphenyl)phosphate or tri(6-dimethylphenyl)phosphate.

The aromatic diphosphate is preferably a compound represented by Formula 1:

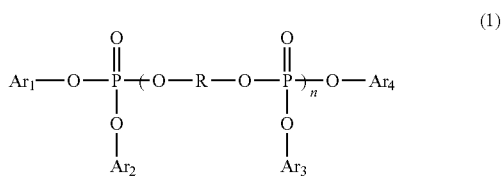

(1)

wherein $Ar_1$, $Ar_2$, $Ar_3$ and $Ar_4$ are independently a phenyl group or a $C_1$-$C_4$ aryl group substituted with one to three $C_1$-$C_4$ alkyl groups, R is phenyl or bisphenol A, and n is an integer of 4 or 5, or pentaerythritol diphosphate of Formula 2:

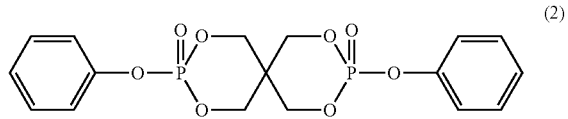

(2)

The monophosphate and the aromatic diphosphate may be used alone or as a mixture thereof. The phosphate compound is preferably used in an amount of 5 to 20% by weight. The use of the flame retardant in an amount of less than 5% by weight provides little improvement in the flame retardancy of the composition. The use of the flame retardant in an amount exceeding 20% by weight induces an improvement in flame retardancy but deteriorates the processability and physical properties, such as low impact strength, of the composition.

The metal sulfonate acts as a catalyst to improve the flame retardancy of the composition. The polymethyl methacrylate used to improve the scratch resistance of the composition tends to be thermally decomposed into the corresponding monomer(s) and has difficulty in forming char to deteriorate the flame retardancy of the composition. The metal sulfonate also functions as a catalyst to accelerate the formation of char of the polycarbonate and the polymethyl methacrylate, resulting in an improvement in flame retardancy.

The fluorinated olefin is used as a flame retardant aid or an anti-drip agent. The fluorinated olefin is selected from those whose characteristics (e.g., copolymer composition) are suitable for the polycarbonate resin, and examples thereof include Teflon, a blend of Teflon and poly(styrene-acrylonitrile) and a blend of Teflon and polymethyl methacrylate. The fluorinated olefin is used in an amount of 0.01 to 3% by weight and preferably 0.05 to 2% by weight. If the fluorinated olefin is used in an amount of less than 0.01% by weight, anti-dripping effects are negligible. If the fluorinated olefin is used in an amount exceeding 2% by weight, the problem of poor appearance may arise during processing.

The composition of the present invention may further comprise one or more additives selected from impact modifiers, antioxidants, weathering stabilizers, lubricants, silicone aids, release agents, pigments, dyes, antistatic agents, antibacterial agents, processing aids, anti-friction wear agents. These additives may be used in appropriate amounts.

The composition of the present invention can be prepared by dry blending the components and melting the blend under heating in a twin-screw extruder, in accordance with a general process known in the art. The components are typically blended in the temperature range of 220 to 300° C. and preferably 230 to 270° C. This blending temperature range is advantageous in terms of physical and chemical affinity between the respective components. The polycarbonate resin composition can be molded by a general process for molding thermoplastic resins, such as injection molding, extrusion molding or blow molding.

MODE FOR THE INVENTION

Hereinafter, the present invention will be explained in more detail with reference to the following examples. The following examples are provided for illustrative purposes only to assist in a further understanding of the invention and are not intended to limit the scope of the invention.

EXAMPLES

Example 1

82.5% by weight of polycarbonate (PC) having a melt index of 15 g/10 min, as measured in accordance with ASTM D1238 (300° C., 1.2 kgf), 12% by weight of bisphenol A diphosphate, 5% by weight of polymethyl methacrylate (PMMA) having a melt index of 3 g/10 min, as measured in accordance with ASTM D1238 (230° C., 3.8 kgf), and 0.5% by weight of a diluted mixture of polytetrafluoroethylene and styrene-acrylonitrile (SAN) as a fluorinated olefin were melt-blended at 260° C. to prepare a polycarbonate resin composition. The resin composition was pelletized and molded using an injection molding machine to obtain a specimen. The physical properties of the specimen were measured by the following methods. The results are shown in Table 1.

(1) Pencil Hardness

The pencil hardness of the specimen was measured using a pencil hardness tester (JUNGDO TESTING INSTRUMENT) and a pencil (Mitsubishi) under a load of 500 g in accordance with ASTM D638.

The formation of scratches in the specimen was visually observed to evaluate the pencil hardness.

(2) Flame Retardancy

The flame retardancy of the specimen (thickness=1.6 mm) was evaluated in accordance with UL-94.

Example 2

The procedure of Example 1 was repeated except that the polycarbonate resin, the phosphate compound and the polymethyl methacrylate resin were used in amounts of 77.5%, 12% and 10% by weight, respectively. The results are shown in Table 1.

Example 3

The procedure of Example 1 was repeated except that the polycarbonate resin, the phosphate compound and the polymethyl methacrylate resin were used in amounts of 64.5%, 15% and 20% by weight, respectively. The results are shown in Table 1.

Example 4

The procedure of Example 1 was repeated except that the polycarbonate resin, the phosphate compound and the polymethyl methacrylate resin were used in amounts of 59.2%, 15% and 25% by weight, respectively, and a metal sulfonate was further added in an amount of 0.3% by weight. The results are shown in Table 1.

Example 5

The procedure of Example 1 was repeated except that the polycarbonate resin, the phosphate compound and the polymethyl methacrylate resin were used in amounts of 52.2%, 17% and 30% by weight, respectively, and a metal sulfonate was further added in an amount of 0.3% by weight. The results are shown in Table 1.

Comparative Example 1

47.5% by weight of polycarbonate (PC) having a melt index of 15 g/10 min, as measured in accordance with ASTM D1238 (300° C., 1.2 kgf), 17% by weight of bisphenol A diphosphate, 35% by weight of polymethyl methacrylate having a melt index of 3 g/10 min, as measured in accordance with ASTM D1238 (230° C., 3.8 kgf), and 0.5% by weight of a diluted mixture of polytetrafluoroethylene and styrene-acrylonitrile (SAN) as a fluorinated olefin were melt-blended at 260° C. to prepare a polycarbonate resin composition. The resin composition was pelletized and molded using an injection molding machine to obtain a specimen. The physical properties of the specimen were measured by the methods specified in Example 1. The results are shown in Table 1.

Comparative Example 2

87.5% by weight of polycarbonate (PC) having a melt index of 15 g/10 min, as measured in accordance with ASTM D1238 (300° C., 1.2 kgf), 12% by weight of bisphenol A diphosphate and 0.5% by weight of a diluted mixture of polytetrafluoroethylene and styrene-acrylonitrile (SAN) as a fluorinated olefin were melt-blended at 260° C. to prepare a polycarbonate resin composition. The resin composition was pelletized and molded using an injection molding machine to obtain a specimen. The physical properties of the specimen were measured by the methods specified in Example 1. The results are shown in Table 1.

Comparative Example 3

Polymethyl methacrylate having a melt index of 3 g/10 min, as measured in accordance with ASTM D1238 (230° C., 3.8 kgf) was melt-blended at 235° C., pelletized, and molded using an injection molding machine to obtain a specimen. The physical properties of the specimen were measured by the methods specified in Example 1. The results are shown in Table 1.

Comparative Example 4

Polycarbonate having a melt index of 15 g/10 min, as measured in accordance with ASTM D1238 (300° C., 1.2 kgf) was melt-blended at 280° C., pelletized, and molded using an injection molding machine to obtain a specimen. The physical properties of the specimen were measured by the methods specified in Example 1. The results are shown in Table 1.

TABLE 1

|  |  | Example No. | | | | | Comparative Example No. | | | |
| --- | --- | --- | --- | --- | --- | --- | --- | --- | --- | --- |
|  |  | 1 | 2 | 3 | 4 | 5 | 1 | 2 | 3 | 4 |
| Composition | Polycarbonate | 82.5 | 77.5 | 64.5 | 59.2 | 52.2 | 47.5 | 87.5 | — | 100 |
|  | Polymethyl methacrylate | 5 | 10 | 20 | 25 | 30 | 35 | — | 100 | — |
|  | Phosphate | 12 | 12 | 15 | 15 | 17 | 17 | 12 | — | — |
|  | Metal sulfate |  |  |  | 0.3 | 0.3 |  |  |  |  |
|  | Fluorinated olefin | 0.5 | 0.5 | 0.5 | 0.5 | 0.5 | 0.5 | 0.5 | — | — |
| Physical properties | Pencil hardness | 1B-HB | HB-F | 1H | 1H | 1H | 1H | 2B-1B | 2-3H | 2B |
|  | Flame retardancy (UL-94) | V-0 | V-0 | V-0 | V-0 | V-0 | V-2 | V-0 | Burn-out | V-2 |

The polycarbonate resin, the phosphate compound and the polymethyl methacrylate resin were used in different amounts in the compositions of Examples 1-3. From the results in Table 1, it can be seen that the compositions of Examples 1-3 showed excellent flame retardancy and had different pencil hardnesses depending on the content of the polymethyl methacrylate resin.

The polymethyl methacrylate resin was used in larger amounts and the metal sulfonate as an organic salt was present in the compositions of Examples 4 and 5. The results in Table 1 confirm that the compositions of Examples 4 and 5 had a high pencil hardness and showed excellent flame retardancy.

When compared with the composition of Example 5, the composition of Comparative Example 1, in which the polymethyl methacrylate resin was used in an amount of 35% by weight and the metal sulfonate was absent, had a high pencil hardness and showed poor flame retardancy.

The results in Table 1 show that the content of the polymethyl methacrylate resin affected the pencil hardness of the compositions of Example 1 and Comparative Example 2.

The polymethyl methacrylate resin of Comparative Example 3 had a high pencil hardness but showed poor flame retardancy. The polycarbonate resin of Comparative Example 4 showed excellent flame retardancy and had a low pencil hardness.

These results lead to the conclusion that the use of the polycarbonate resin, the polymethyl methacrylate resin, the phosphate compound, the metal sulfonate and the fluorinated olefin in the amounts defined above ensures excellent flame retardancy (V-0) and overcomes the problem of low pencil hardness arising from the use of the polycarbonate resin. In addition, the results in Table 1 show that the pencil hardness of the compositions was affected by the content of the polymethyl methacrylate resin in the compositions.

The invention claimed is:

1. A flame-retardant, scratch-resistant polycarbonate resin composition comprising (A) 50 to 85% by weight of a polycarbonate resin, (B) 5 to 30% by weight of a polymethyl methacrylate resin, (C) 12 to 17% by weight of an aromatic diphosphate compound, (D) 0.01 to 2% by weight of an organic salt selected from the group consisting of sodium trichlorobenzene sulfonate, sodium polystyrene sulfonate, and mixtures thereof, and (E) 0.05 to 2% by weight of a fluorinated olefin.

2. The composition according to claim 1, wherein the polycarbonate resin is prepared by reacting a divalent phenolic compound with phosgene or a carbonic acid diester compound and contains no halogen.

3. The composition according to claim 1, wherein the polymethyl methacrylate resin is methyl methacrylate homopolymers, methyl methacrylate-acrylate copolymers, or mixtures thereof.

4. The composition according to claim 1, wherein the aromatic diphosphate is a compound represented by Formula 1:

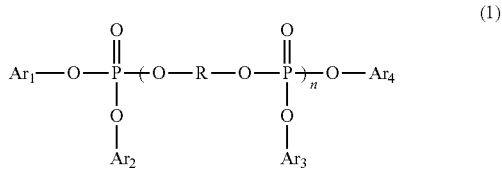

(1)

wherein $Ar_1$, $Ar_2$, $Ar_3$ and $Ar_4$ are independently a phenyl group or an aryl group substituted with one to three $C_1$-$C_4$ alkyl groups, R is phenyl or bisphenol A, and n is an integer of 4 or 5, the compound represented by Formula 2:

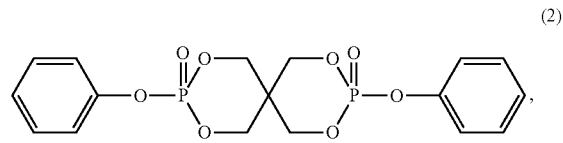

(2)

or a mixture thereof.

5. The composition according to claim 1, wherein the fluorinated olefin is polytetrafluoroethylene, a mixture of polytetrafluoroethylene and poly(styrene-acrylonitrile), or a mixture of polytetrafluoroethylene and polymethyl methacrylate.

6. The composition according to claim 1, further comprising one or more additives selected from the group consisting of impact modifiers, lubricants, heat stabilizers, UV stabilizers, anti-drip agents, pigments, dyes, and inorganic fillers.

* * * * *